Patented Oct. 13, 1936

2,057,145

UNITED STATES PATENT OFFICE 2,057,145

PHARMACEUTICAL PREPARATION FOR STIMULATING THE RESPIRATORY CENTRE AND INCREASING THE CIRCULATION

Felix Haffner, Tubingen, and Fritz Sommer, Berlin-Charlottenburg, Germany, assignors to the firm: Chemische Fabrik Grünau, Landshoff & Meyer A. G., Berlin-Grunau, Germany, a company of Germany No Drawing. Application February 7, 1935, Serial No. 5,494. In Germany February 9, 1934

1 Claim. (Cl. 167—65)

The present invention relates to a pharmaceutical preparation for stimulating the respiratory centre and increasing the circulation.

One of the objects of our invention is to provide a stimulating preparation of a high therapeutic utility, which may be used in cases, where a quick and efficient action of the preparation is required.

According to the invention the principal effecting ingredient of our stimulating preparation is phthalic di-diethylamide. Said pharmaceutical preparation may be introduced into the body in any desired way, such as by injection, by rectal introduction or by oral administration.

In order to manufacture our preparation, a reaction of a halide of phthalic acid with diethylamine is caused, phthalic di-diethylamide being thereby obtained.

The present invention is based on the observation that quite generally the diethylamides of the phthalic acid and hydrophthalic acid series have the effect of stimulating the respiratory centre and increasing the circulation.

More accurate investigations have shown, however, that o-phthalic di-diethylamide has a considerably stronger and more rapid action in increasing the circulation than the corresponding compounds of isophthalic acid and terephthalic acid (meta-phthalic acid and para-phthalic acid), which is apparently to be attributed to the greater solubility in water of o-phthalic di-diethylamide.

The di-diethylamides of the hydrophthalic acid series are only obtainable with difficulty and in particular scarcely at all in the pure form. For this reason, their use as pharmaceutical preparations scarcely comes into consideration.

The excellent effect of o-phthalic di-diethylamide in stimulating the respiratory centre and increasing the circulation was not to be expected. In this connection, it is noteworthy that compounds having a corresponding constitution, in which the ethyl residues are replaced by other alkyl residues have been found to stimulate the respiratory centre either not at all or only feebly. The corresponding methyl compound is scarcely effective and the compounds in which the ethyl residues are replaced by higher alkyl residues, for example propyl or amyl groups, likewise exhibit only a very slight effect, probably due to the diminished solubility in water. On the contrary, the compounds having different alkyl substituents, particularly if not all the ethyl groups are replaced by other alkyl residues, exhibit a certain effect.

In the case of the reaction of derivatives of phthalic acid other than the halides with diethylamine or derivatives of diethylamine, the yields obtained are much poorer than in the case of the reaction of the halides of phthalic acid.

The manufacture of the preparation will be illustrated by the following examples:

Example 1

50 grams of phthalic acid are reacted according to Ott, "Ann. der Chemie", vol. 392, p. 273 with 74 grams of phosphorus pentachloride. 63 grams of phthalyl chloride are obtained.

31.5 grams of phthalyl chloride are dissolved in 50 cc. of ether and are poured gradually into a solution of 50 grams of diethylamine in 250 cc. of ether, with thorough stirring. After removing the ether and the resulting diethylamine hydrochloride, the oily crude product is subject to a distillation in vacuo. There are obtained 30 grams of a product boiling between 175° and 180° C. under 5 mm. of mercury, which at first forms an almost colourless liquid and which later solidifies to large crystals of a melting point of about 39° C. which are readily soluble in water.

Example 2

The following method is applicable for the manufacture of o-phthalic di-diethylamide in large quantities:

1.6 kilograms of diethylamine (98 per cent.) are dissolved in 3.2 kilograms of water. 1 kilogram of phthalyl chloride is slowly introduced into this solution with stirring, the temperature being maintained at about 15° C. The o-phthalic di-diethylamide formed is salted out by saturating the aqueous solution with common salt. The oil which separates on the surface is separated. The purification of the crude product is preferably effected by dissolving the crude product in about 6 litres of water, filtering the solution with the addition of 200 grams of active charcoal and again salting out the reaction product from the filtrate.

The subsequent purification of the crude product is then effected as in Example 1 by vacuum distillation.

If desired, half of the specified quantity of diethylamine may be taken if, instead thereof, the equivalent quantity of alkali or alkali carbonate is added for binding the hydrochloric acid of the aqueous solution.

We claim:—

A pharmaceutical preparation for stimulating the respiratory centre and increasing the circulation in which the principal effecting ingredient is phthalic di-diethylamide.

FELIX HAFFNER.
FRITZ SOMMER.